United States Patent
Moustgaard et al.

(10) Patent No.: US 6,240,647 B1
(45) Date of Patent: Jun. 5, 2001

(54) ORIENTEERING COMPASS AND DISTANCE MEASURING DEVICE

(75) Inventors: Hans-Aage Moustgaard, Helsinki; Mika Hautamäki, Espoo, both of (FI)

(73) Assignee: Suunto Oyj (FI)

( * ) Notice: Subject to any disclaimer, the term of this patent is extended or adjusted under 35 U.S.C. 154(b) by 0 days.

(21) Appl. No.: 09/336,189

(22) Filed: Jun. 18, 1999

(30) Foreign Application Priority Data

Jun. 23, 1998 (FI) .................................................. 981442

(51) Int. Cl.$^7$ ...................................................... G01B 3/12
(52) U.S. Cl. ................................................ 33/15 B; 33/774
(58) Field of Search ........................... 33/27.01, 27.02, 33/27.03, 27.31, 27.32, 15 B, 15 A, 15 SD, 706, 772, 774, 779, 780, 333, 334, 354, 355 R

(56) References Cited

U.S. PATENT DOCUMENTS

| | | | | |
|---|---|---|---|---|
| 361,791 | * | 4/1887 | Stoner | 33/779 |
| 997,648 | * | 7/1911 | Cavanagh et al. | 356/4.01 |
| 1,383,340 | * | 5/1921 | Robbins | 356/4.01 |
| 1,923,793 | * | 8/1933 | Niederhauser | 234/36 |
| 1,961,066 | * | 5/1934 | Mix | 33/333 |
| 3,514,582 | * | 5/1970 | Sanderson | 33/1 SB |
| 3,878,612 | | 4/1975 | Reed . | |
| 4,802,283 | | 2/1989 | Trump . | |
| 5,940,172 | * | 8/1999 | Ball | 356/146 |
| 5,949,529 | * | 9/1999 | Dunne et al. | 356/4.01 |

FOREIGN PATENT DOCUMENTS

| | | | | |
|---|---|---|---|---|
| 15136 | * | 9/1881 | (DE) | 33/779 |
| 3245864 | * | 6/1984 | (DE) | 33/779 |
| 67261 | | 10/1984 | (FI) . | |
| 2 645 265 | | 10/1990 | (FR) . | |
| 2 733 184 | | 10/1996 | (FR) . | |
| 0422611 | * | 1/1935 | (GB) | 33/141 |
| 36901 | * | 2/1985 | (JP) | 33/779 |
| 1478033 | * | 5/1989 | (SU) | 33/779 |
| WO 87/01442 | | 3/1987 | (WO) . | |

* cited by examiner

Primary Examiner—Diego Gutierrez
Assistant Examiner—Maria Fernandez
(74) Attorney, Agent, or Firm—Leydig, Voit & Mayer, Ltd.

(57) ABSTRACT

The invention relates to an orienteering compass comprising a distance measuring device (4) including a circular element (11) to be rotated over a map from an arbitrary point A to an arbitrary point B for determining the distance from point A to point B. In order to make orienteering easier without significantly enlarging the size of the compass, the distance measuring device comprises an axis (7) provided with a screw thread (6), a pointer (11) to be moved using the screw thread (6) and at least one measuring scale (13, 14) for indicating the distance. The invention also relates to a distance measuring device for an orienteering compass provided with a base plate.

2 Claims, 3 Drawing Sheets

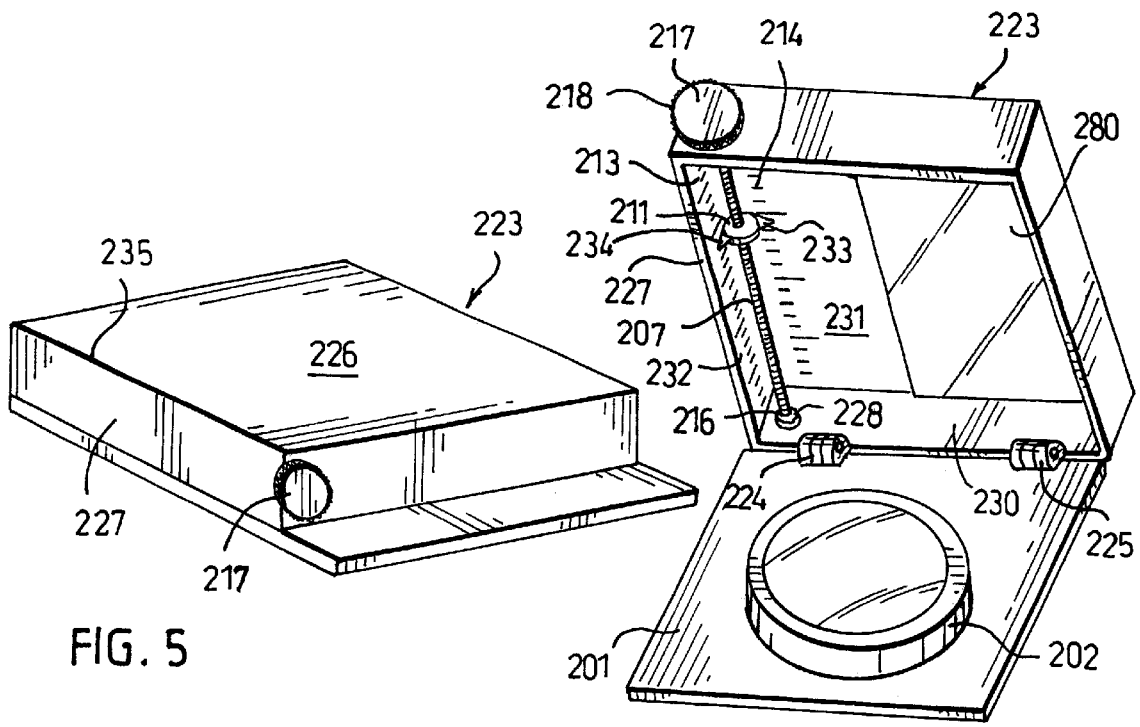
FIG. 5
FIG. 6
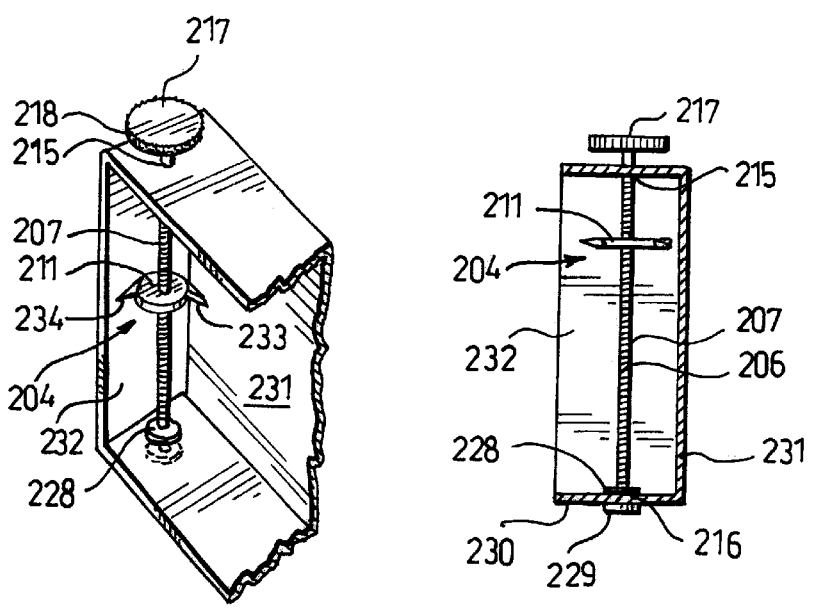
FIG. 7
FIG. 8

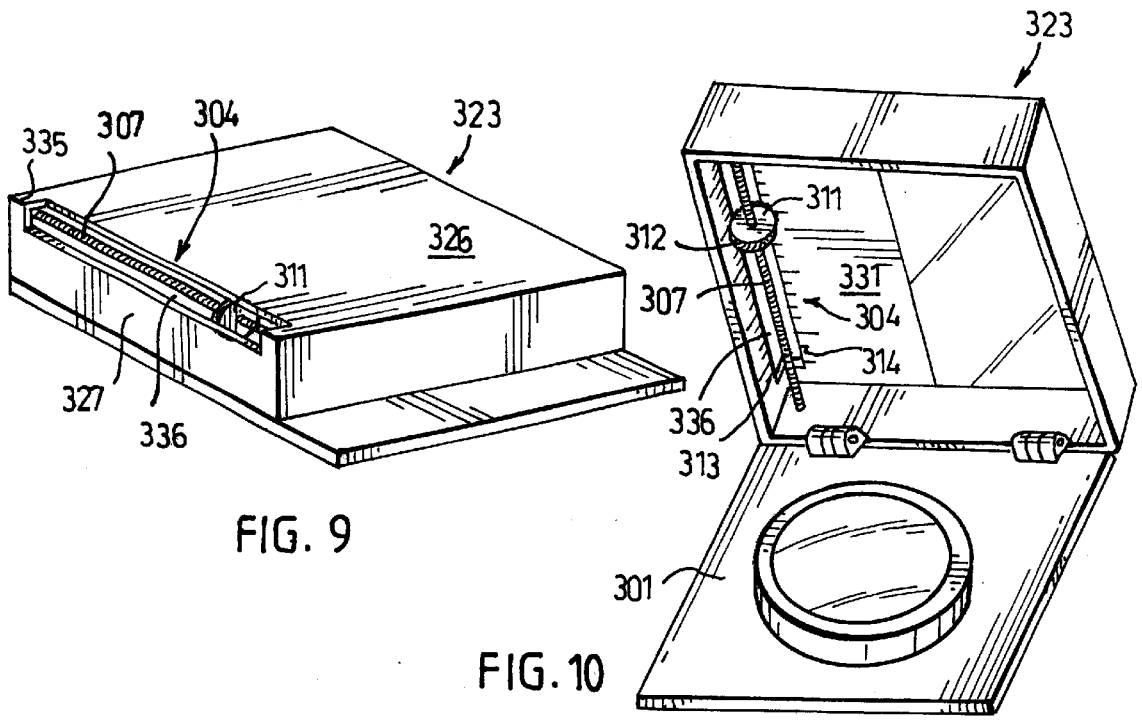
FIG. 9
FIG. 10
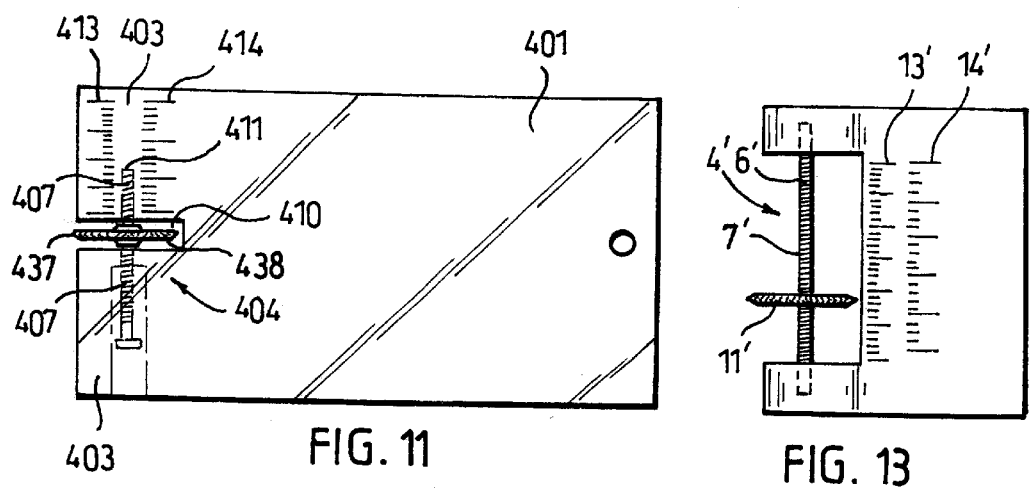
FIG. 11
FIG. 13
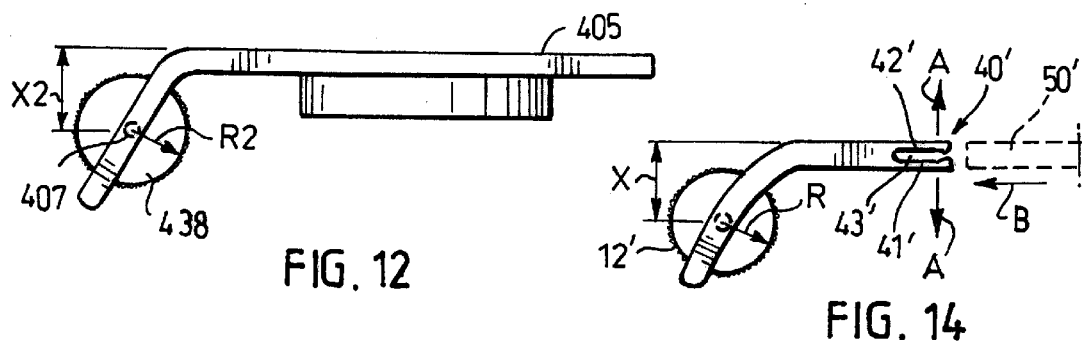
FIG. 12
FIG. 14

ORIENTEERING COMPASS AND DISTANCE MEASURING DEVICE

BACKGROUND OF THE INVENTION

The invention relates to an orienteering compass comprising a distance measuring device including a circular element to be rotated over a map from an arbitrary point A to an arbitrary point B for determining the distance from point A to point B.

The invention also relates to a distance measuring device for an orienteering compass comprising a base plate.

Orienteering in the terrain usually involves using a map and an orienteering compass. A compass enables the orienteerer to find out which direction to take in order to arrive at a desired location in the terrain. In addition to the direction, it is important to know the distance. The distance can be determined by measuring the distance between two arbitrary points on the map using a measuring scale on the orienteering compass and by comparing the measured result with the measuring scale on the map. If an orienteerer takes a course in the terrain that deviates from a direct line, then the distance is difficult to determine in practice, especially if it should be accurately determined. When determining the length of a twisting course the orienteering compass including a measuring scale has to be placed on the map several times so that the measuring scale conforms to the twisting course. Determining the distance is thus slow and cannot be very accurately measured.

It is known to use a distance measuring device in order to facilitate the determination of the length of a course on a map and particularly on a nautical map. Then the distance measuring device can be such that it comprises an axis provided with a thread, along which a rotating element is arranged to move guided by the threads on the axis. When the rotating element is pressed against the map and when it is given the chance to rotate the distance to be traveled, the rotating element moves a certain distance along the axis. It is fairly easy to determine the length of a course by comparing the distance the rotating element has moved on the axis to the measuring scale on the map.

It is also known to use distance measuring devices shaped as pens, the operating principle of which is to measure the rotation of the ball at the tip of the distance measuring device. The ball can roll along the course to be traveled, and the distance measuring device provides a reading on the distance to be traveled. Such a distance measuring device is very useful when the length of a twisting course is measured. However, such a distance measuring device has disadvantages like the high price and the unreliable function when the ball gets dirty, as it then no longer registers the distance reliably.

An orienteering compass including a capsule around which a revolving wheel is arranged is known to facilitate and speed up orienteering. The idea is to press the outer circumference of the wheel against the map so that the outer circumference revolves in relation to the capsule when it rotates against the map. The inner circumference of the wheel then slides against the circumference of the capsule. The length of the travel distance can be determined by letting the outer circumference of the wheel rotate in accordance with the travel distance, the measuring scale on the compass then showing the distance that the wheel has moved and the obtained result is compared with the measuring scale on the map. In principle, this orienteering compass functions very well, but a drawback is that it may provide an incorrect measurement result in addition to that it tends to damage the surface of the map. Said drawbacks are in essence caused by the fact that the inner circumference of the wheel has to be large (correspond to the size of the capsule), thus causing high friction. In order for the wheel to rotate as intended the friction force has to be exceeded, which is why the outer circumference of the wheel is cogged so that the friction against the map surface should be adequate. The cogged surface damages the map surface. If there is no cogged surface or the outer circumference of the wheel is not pressed forcefully enough against the map surface, the outer circumference slides along the map, and naturally an incorrect measurement result is obtained. Another drawback of the prior art orienteering compass provided with a distance measuring device is the large size thereof, caused by the structure comprising a large wheel mounted around the compass capsule. A further drawback is that the distance measuring device tends to break easily; as a protruding part the wheel is easily damaged.

BRIEF DESCRIPTION OF THE INVENTION

It is an object of the present invention to provide an orienteering compass which eliminates all said drawbacks and which substantially improves the properties of the compass needed in orienteering. For implementing this the present invention provides an orienteering compass wherein the distance measuring device comprises an axis provided with a screw thread, a pointer to be moved by the screw thread and at least one measuring scale for indicating the distance.

The preferred embodiments of the orienteering compass are presented in the attached claims.

The present invention also provides a distance measuring device wherein the distance measuring device comprises an axis provided with a screw thread, a pointer to be moved using the screw thread, at least one measuring scale for indicating the distance and attachment means for attaching the distance measuring device to the orienteering compass. Preferably the attachment means are arranged for receiving a compass comprising a base plate, whereby the attachment means comprise maw means for receiving a side of the base plate.

The most significant advantage of the orienteering compass of the invention is that the compass substantially facilitates orienteering without having to be significantly larger than a conventional orienteering compass. The orienteering compass of the invention is also reliable and it does not damage the map, and the structure thereof can be made very simple.

The most significant advantages of the distance measuring device of the invention are similar to the ones offered by the orienteering compass of the invention when attached to a conventional orienteering compass.

BRIEF DESCRIPTION OF THE DRAWINGS

In the following the invention will be explained in connection with the preferred embodiments with reference to the accompanying drawings, in which FIGS. 5 and 6 are perspective views showing a third preferred embodiment of the orienteering compass of the invention comprising an openable lid, FIGS. 7 and 8 show a detail of FIG. 6 from different angles, FIGS. 9 and 10 are perspective views showing a fourth preferred embodiment of the orienteering compass of the invention comprising an openable lid, FIGS. 11 and 12 show top and side views of a fifth preferred embodiment of the invention, and FIGS. 13 and 14 show top and side views of a preferred embodiment of a distance measuring device of the invention.

DETAILED DESCRIPTION OF THE INVENTION

Figure 1:
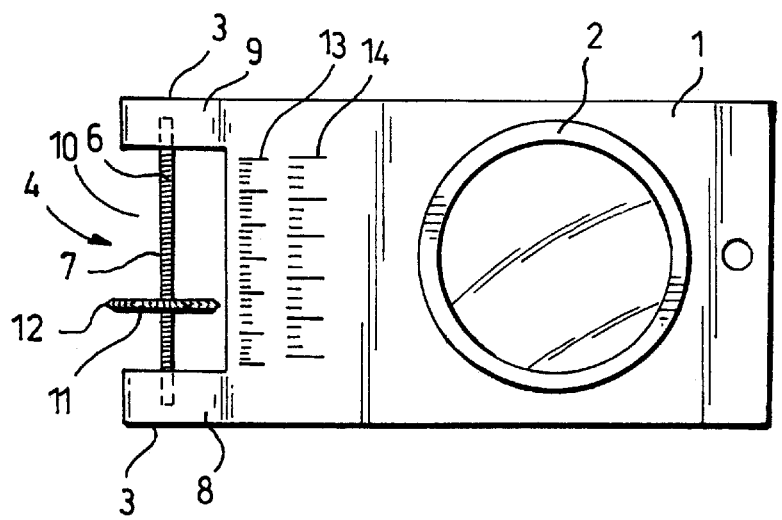
FIGS. 1 and 2 show top and side views of a first preferred embodiment of an orienteering compass of the invention.

FIG. 1 shows an orienteering compass comprising a base plate 1, a capsule 2 and a distance measuring device 4 arranged to one side 3 of the base plate. The base plate 1 comprises a planar bottom surface 5 to be placed against a map (not shown). The capsule 2 of the orienteering compass is conventional and the structure thereof is familiar to a person skilled in the art, and will therefore not be further explained here.

The distance measuring device 4 comprises an axis 7 provided with a screw thread 6, the axis being non-rotably attached to lugs 8, 9 on the sides of the base plate. There is a cut 10 between the lugs into which the axis 7 is arranged.

Figure 2:
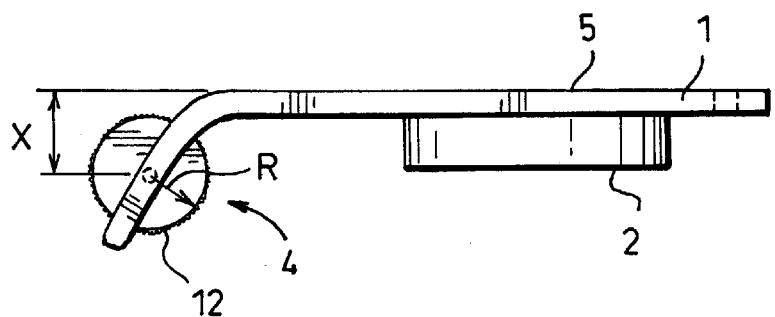

Reference numeral 11 indicates a pointer to be rotated by the screw threads of the axis 7. The pointer is formed of a discoid rotating member 11, an outer circumference 12 of which may preferably comprise a rubber surface for adding friction. There is a threaded opening in the center of the pointer 11. When the pointer 11 is rotated it moves by means of the screw thread along the longitudinal direction of the axis. Next to the cut 10 there are two measuring scales 13 and 14 with different scales so that the distance measuring device provides a direct distance reading when used with maps provided with particular, general scales. FIG. 2 shows that the axis 7 is arranged at a projected distance X from the bottom surface 5. Beam R of the pointer 11 is smaller than distance X. On account of the above the pointer 11 of the distance measuring device does not interfere when the compass is used for taking a bearing.

The threads 6 on the axis 7 and beam R of the pointer 11 can preferably be formed such that the pointer moves a distance on the axis that equals the distance that the pointer's outer circumference 12 has rotated. This is achieved by selecting a correct pitch in relation to beam R of the pointer 11. Such a distance measuring device can be used with maps of any scale.

The axis 7 is preferably made of durable and long-lasting material, for example metal having good abrasion resistance.

The distance measuring device 4 of the orienteering compass in FIGS. 1 and 2 is used so as to let the circumference 12 of the pointer 11 rotate along the travel distance on the map, whereafter the measuring scales 13 and 14 indicate the distance the pointer has moved along the axis 7.

Figure 3:
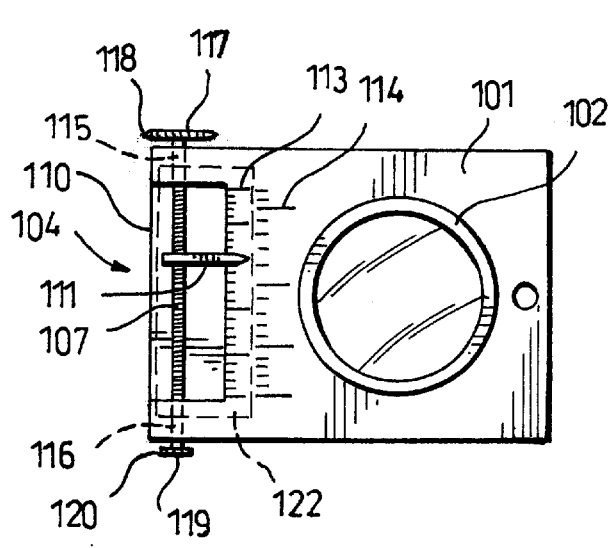
FIGS. 3 and 4 show top and side views of a second preferred embodiment of the orienteering compass of the invention.
Figure 4:
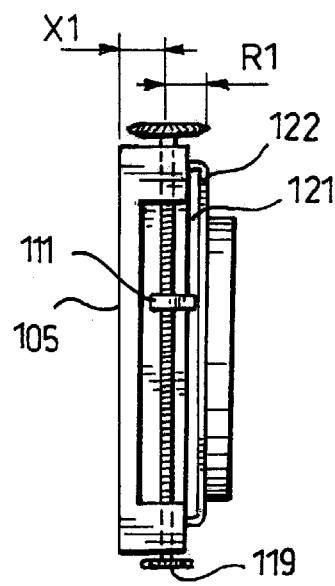

FIGS. 3 and 4 show the second preferred embodiment of the invention. The embodiment differs from the embodiment in FIGS. 1 and 2 in such a manner that an axis 107 of a distance measuring device 104 is rotatably supported on a base plate 101 by means of bearings 115, 116, and a pointer 111 is non-rotatably arranged to the axis. In order to rotate the axis 107 a rotating element 117 comprising a circumferential periphery 118 arranged outside a cut 110 is fixedly attached thereto. Reference numeral 119 indicates another rotating element comprising a circumferential periphery 120 with a smaller diameter than the rotating element 117 arranged outside the cut (recess) 110 for rotating the axis 107. Depending on the scale of the map, the rotating element 117 or 119 suitable for the purpose is used.

The pointer 111 is formed of a needle-like element that does not rotate with the axis 107 because it is arranged to a slot 121 formed of the compass base plate 101 and a plate 122 protecting the axis 107. In FIG. 3 the protective plate 122 is indicated by a dashed line. The needle 111 then moves against the sides of the slot 121. The tip of the needle 111 is directed towards measuring scales 113, 114 indicating the distance traveled.

Distance X1 is larger than beam R1 of the rotating element.

The advantage of the compass in FIGS. 3 and 4 is that it is suited to provide a measurement value that is easy to read when using maps of different scales, which is due to the fact that the length of the pointer can be selected to extend to several scales 113, 114 and that two rotating elements 117, 119 with different diameters are arranged outside the end of the base plate 101 and the cut (recess) 110.

FIGS. 5 and 6 show a mirror compass comprising a lid 223 used in orienteering. The lid 223 comprising a main surface 226 and four sides 227 and a mirror 280 is attached by hinges 224, 225 to a compass base plate 201 including a capsule 202. FIGS. 7 and 8 illustrate the structure of a distance measuring device 204 arranged to an edge 235 of the lid, where the lid of a main surface 226 joins the side 227. The distance measuring device 204 comprises a rotating axis 207 provided with a thread 206 and a pointer 211 moving in the longitudinal direction of the axis by means of the thread. The axis 207 is pivotally mounted to the lid 223 into holes 215, 216 on the lid. Stopping elements 228, 229 are arranged around the axis to prevent the axis 207 from moving longitudinally. The stopping elements are formed of base plates 228, 229 which press the axis and/or which are placed into thinned sections provided for them on the axis. A back side 230 of the lid is placed between the thinned sections substantially free from play.

A rotating element 217 comprising a circumferential periphery 218 that is fixedly arranged to the axis outside the lid rotates the axis 207 of the distance measuring device 204.

The pointer 211 is formed in such a manner that it leans against an inner surface 231 of the main surface 226 of the lid 223 and against an inner surface 232 of the side 227 of the lid, and can thus not be twisted when rotating the axis 207.

The pointer 221 comprises two tips 233, 234 pointing at corresponding measuring scales 213, 214.

In the orienteering compass shown in FIGS. 5 and 6 the distance measuring device 204 is well protected and utilizes the space inside the lid without increasing the size of the compass. The axis 207 and the pointer 211 are well protected inside the lid 223, wherefore they can be made of plastic. Deviating from the Figure the rotating element 217 can mainly be arranged inside the lid 223 so that only a small part of the circle 218 thereof protrudes from the lid through a small slot made on the edge 235 of the lid.

FIGS. 9 and 10 illustrate a mirror compass, which differs from the mirror compass shown in FIGS. 5 and 6 in such a manner that an axis 307 of a distance measuring device 304 is arranged to be fixed, i.e. to be non-rotatable regarding a lid 323, and the pointer is formed of a rotating member 311 comprising a circumferential periphery 312 and in relation thereto a coaxial opening for the axis 307. An elongated slot 336 is formed on an edge 335 at the joint between a main surface 331 and a side 327 of the lid so that the pointer can protrude from the lid 323. Measuring scales 313, 314 are formed inside the lid as shown in FIG. 6, but can alternatively be formed on outer surfaces 326, 327 of the lid on one side or on both sides of the slot 336.

FIGS. 11 and 12 show a fifth preferred embodiment of the compass. The compass differs from the compasses in FIGS. 1, 3, 5 and 9 in such a manner that an axis 407 of a distance measuring device 404 is arranged to move in the longitudinal direction by means of a screw thread 406, and a tip 411 of the axis simultaneously forming a pointer. The axis 407 is supported by a compass base plate 401 in such a manner that the position of the tip 411 can be observed. This is according to the Figure implemented so that the axis is positioned inside the base plate, i.e. within the material thereof. Preferably the base plate 401 is made of transparent plastic or glass. The base plate 401 does not have to be uniformly made of transparent material but said material can be used locally nearby the axis 407. The tip 411 can alternatively be "free" between its extreme positions so that none of the compass parts surrounds it. In order to move the axis 407 a rotating element 438 including a circumferential periphery 437 is arranged thereto. Measuring scales 413, 414 are placed alongside the axis 407. The axis 407 and the rotating element 438 are arranged on a side 403 of the compass base plate 401 in such a manner that distance X2 of the axis to a bottom surface 405 of the compass is greater than beam R2 of the rotating element 438. The rotating element 438 is arranged to a narrow cut 410 located on the center line of the compass. On account of the central location of the rotating element 438 the axis 407 can be fully fitted inside the outlines of the compass, and be well protected therein.

FIGS. 13 and 14 illustrate a distance measuring device 4' of FIG. 1 comprising attachment means 40' for attaching the distance measuring device to a conventional disc compass 50' illustrated by a dashed line. In FIGS. 13 and 14 reference numerals analogical to the ones used in FIG. 1 are employed for corresponding parts.

The attachment means 40' are formed as fast attachment means and composed of a slot or maw 43' into which the compass 50' is pressed in the direction of arrow B so that it takes hold of the jaws 41' and 42' determining the maw 43' and bending in the direction of arrows A. On account of the flexibility of the jaws the distance measuring device 4' remains firmly attached to the compass 50'. In order to secure firm fastening of the distance measuring device to the compass, either one or both jaws 41', 42' can be provided with protrusions which grip into cavities (not shown) formed on the surface of the compass 50' base plate. Other fast attachment means can also be considered. Attachment means of screw-nut type can, for example, also be used, for which holes have to be made onto the compass base plate. Naturally the distance measuring device to be attached to the compass can alternatively have the structure illustrated in FIGS. 3 or 11.

The invention has above been described by way of examples and therefore it should be noted that the details of the invention can be implemented in various ways within the scope of the attached claims. The design and the position of the pointer may therefore vary, as well as the number of rotating elements and measuring scales. The same compass may also comprise two distance measuring devices independent of one another intending to diversify the functions of the device so as to be applicable for use with maps of different scales.

What is claimed is:

1. An orienteering compass for movement over a map from an arbitrary point A to an arbitrary point B to determine the distance from point A to point B, said compass comprising a distance measuring device comprising a base, an axis rotatably coupled to said base and having a screw thread, a circular element being rotatable over said map and being secured to said axis such that rotating the circular element rotates the axis, a pointer rotatably coupled to and moveable along the screw thread in response to rotation of the circular element, and the base being provided with at least one measuring scale, said pointer being non-rotatably disposed relative to the base and being moveable along the measuring scale to indicate the distance from point A to point B, said base comprising a base plate including an edge, a recess along said edge, and a planar bottom surface to be placed on the map when taking a distance measurement, the circular element not being disposed within said recess, and the pointer being disposed within the recess, and the base plate comprising bearings for rotatably receiving said axis, said circular element having a radius R1, and said bearings being disposed at a distance X1 from the bottom surface, the distance X1 being greater than radius R1 of the circular element.

2. An orienteering compass as claimed in claim 1, further comprising a protective plate attached to the base plate and a slot between the protective plate and the base plate, and wherein the pointer is disposed such that it is moveable in said slot between the base plate and said protective plate attached to the base plate.

* * * * *